United States Patent
Marathe et al.

(10) Patent No.: US 12,487,837 B2
(45) Date of Patent: Dec. 2, 2025

(54) METHOD AND SYSTEM FOR MULTIPLE EMBEDDED DEVICE LINKS IN A HOST EXECUTABLE

(71) Applicant: Nvidia Corporation, Santa Clara, CA (US)

(72) Inventors: Jaydeep Marathe, San Jose, CA (US); Michael Murphy, Newark, CA (US); Sean Y. Lee, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/268,106

(22) Filed: Feb. 5, 2019

(65) Prior Publication Data

US 2019/0171466 A1   Jun. 6, 2019

Related U.S. Application Data

(63) Continuation of application No. 13/850,237, filed on Mar. 25, 2013, now Pat. No. 10,261,807.
(Continued)

(51) Int. Cl.
*G06F 9/445* (2018.01)
*G06F 8/41* (2018.01)
*G06F 8/54* (2018.01)

(52) U.S. Cl.
CPC ............ *G06F 9/44521* (2013.01); *G06F 8/41* (2013.01); *G06F 8/54* (2013.01)

(58) Field of Classification Search
CPC ........... G06F 9/44521; G06F 8/41; G06F 8/54
See application file for complete search history.

(56) References Cited

U.S. PATENT DOCUMENTS 7,746,347 B1 *  6/2010  Brown ................. G06T 15/005
                                                345/503
8,296,743 B2   10/2012  Linderman et al.
(Continued)

FOREIGN PATENT DOCUMENTS

WO     WO2011053303     5/2011

OTHER PUBLICATIONS

U.S. Non-Final Office Action issued in U.S. Appl. No. 13/850,207 dated Nov. 5, 2014 (related issued U.S. Pat. No. 9,483,235).
(Continued)

*Primary Examiner* — Wei Y Zhen
*Assistant Examiner* — Amir Soltanzadeh
(74) *Attorney, Agent, or Firm* — Davis Wright Tremaine LLP

(57) ABSTRACT

Embodiments of the present invention provide a novel solution to generate multiple linked device code portions within a final executable file. Embodiments of the present invention are operable to extract device code from their respective host object filesets and then link them together to form multiple linked device code portions. Also, using the identification process described by embodiments of the present invention, device code embedded within host objects may also be uniquely identified and linked in accordance with the protocols of conventional programming languages. Furthermore, these multiple linked device code portions may be then converted into distinct executable forms of code that may be encapsulated within a single executable file.

23 Claims, 9 Drawing Sheets

Related U.S. Application Data

(60) Provisional application No. 61/644,981, filed on May 9, 2012.

(56) References Cited

U.S. PATENT DOCUMENTS

| | | | |
|---|---|---|---|
| 8,375,368 | B2 | 2/2013 | Tuck et al. |
| 8,448,156 | B2 | 5/2013 | Demetriou et al. |
| 9,483,235 | B2 | 11/2016 | Murphy et al. |
| 9,495,720 | B2 * | 11/2016 | Kim ..................... G06T 1/20 |
| 2010/0138376 | A1 | 6/2010 | Avis et al. |
| 2010/0153934 | A1 | 6/2010 | Lachner |
| 2011/0252411 | A1 | 10/2011 | Matin et al. |
| 2011/0314256 | A1 | 12/2011 | Callahan et al. |
| 2011/0314458 | A1 | 12/2011 | Zhu et al. |
| 2012/0075316 | A1 | 3/2012 | Kim et al. |
| 2012/0317556 | A1 | 12/2012 | Zhu |
| 2013/0305233 | A1 | 11/2013 | Murphy et al. |
| 2013/0305234 | A1 | 11/2013 | Marathe et al. |

OTHER PUBLICATIONS

U.S. Final Office Action issued in U.S. Appl. No. 13/850,207 dated Jun. 12, 2015 (related issued U.S. Pat. No. 9,483,235).
U.S. Non-Final Office Action issued in U.S. Appl. No. 13/850,207 dated Nov. 2, 2015 (related issued U.S. Pat. No. 9,483,235).
U.S. Notice of Allowance issued in U.S. Appl. No. 13/850,207 dated Jun. 30, 2016 (related issued U.S. Pat. No. 9,483,235).
U.S. Non-Final Office Action issued in U.S. Appl. No. 13/850,237 dated Jul. 16, 2014.
U.S. Final Office Action issued in U.S. Appl. No. 13/850,237 dated Jan. 14, 2015.
U.S. Non-Final Office Action issued in U.S. Appl. No. 13/850,237 dated May 18, 2015.
U.S. Final Office Action issued in U.S. Appl. No. 13/850,237 dated Sep. 25, 2015.
U.S. Non-Final Office Action issued in U.S. Appl. No. 13/850,237 dated Mar. 16, 2016.
U.S. Final Office Action issued in U.S. Appl. No. 13/850,237 dated Aug. 8, 2016.
U.S. Non-Final Office Action issued in U.S. Appl. No. 13/850,237 dated Mar. 22, 2017.
U.S. Non-Final Office Action issued in U.S. Appl. No. 13/850,237 dated Jan. 31, 2018.
U.S. Notice of Allowance issued in U.S. Appl. No. 13/850,237 dated Jan. 9, 2019.
The Authoritative Dictionary of IEEE Standards Terms, Seventh Edition, IEEE Std 100-2000, Published Feb. 27, 2007, pp. 625 and 752.
Ueng, Sain-Zee et al., CUDA-lite: Reducing GPU programming complexity, [Online] 2008, Languages and Compilers for Parallel Computing, Springer Berlin Heidelberg, 2008 [Retrieved from Internet].
DE Non-Final Office Action issued in application serial No. 10 2013 208 560.5 dated Aug. 7, 2020.
"The Authoritative Dictionary of IEEE Standards Terms, Seventh Edition," IEEE Standard 100-2000, Published Feb. 27, 2007, 2 pages.

* cited by examiner

Table 300

| Memory Address | Shadow Entity Name | Device Entity Name |
|---|---|---|
| Memory Location 300-1 | Shadow Entity 112-2 | Device Entity 114-2 |
| Memory Location 300-2 | Shadow Entity 112-3 | Device Entity 114-3 |
| Memory Location 300-3 | Shadow Entity 122-2 | Device Entity 124-2 |
| Memory Location 300-4 | Shadow Device Entity 122-3 | Device Entity 124-3 |
| . . . | . . . | . . . |

Figure 1C

Exemplary Compilation Process Flow
250

Exemplary Shadow Entity Generation Process Flow
350

Device Linker Table 400

| Host Object Ancestor | Device Codes Identified | Linking Operations Participated in | Module_ID |
|---|---|---|---|
| Host Object 110 | Compiled Device Code 114 | Linked Device Code 145 | 114_145 |
| Host Object 120 | Compiled Device Code 124 | Linked Device Code 145 | 124_145 |
| Host Object 130 | Compiled Device Code 134 | Linked Device Code 245 | 134_245 |
| Host Object 150 | Compiled Device Code 154 | Linked Device Code 245 | 154_245 |
| . | . | . | . |

Figure 5

METHOD AND SYSTEM FOR MULTIPLE EMBEDDED DEVICE LINKS IN A HOST EXECUTABLE

CROSS-REFERENCE TO RELATED APPLICATIONS

This application is a continuation of allowed U.S. application Ser. No. 13/850,237, entitled "A METHOD AND SYSTEM FOR MULTIPLE EMBEDDED DEVICE LINKS IN A HOST EXECUTABLE" filed Mar. 25, 2013, which claims priority to U.S. Provisional Application No. 61/644,981 entitled "A METHOD AND SYSTEM FOR MULTIPLE EMBEDDED DEVICE LINKS IN A HOST EXECUTABLE", filed May 9, 2012, all of which are hereby incorporated by reference herein in their entireties.

This application is related to U.S. patent application Ser. No. 13/850,207, entitled "A METHOD AND SYSTEM FOR SEPARATE COMPILATION OF DEVICE CODE EMBEDDED IN HOST CODE," filed Mar. 25, 2013 and issued as U.S. Pat. No. 9,483,235 on Nov. 1, 2016, which is herein incorporated by reference in its entirety.

FIELD OF THE INVENTION

Embodiments of the present invention are generally related to graphics processing units (GPUs) and compilers for heterogeneous environments, (e.g., GPU and CPU).

BACKGROUND OF THE INVENTION

Software executable files are typically generated by compiling separate host objects, where each host object includes a respective portion of source code or host code (e.g., written in a high-level language such as C, C++, etc.). The executable file generated by the compiler includes object code that can be executed by a central processing unit (CPU). More recently, host systems including a CPU and a graphics processing unit (GPU) have begun to take advantage of the parallel processing capability of the GPU to perform tasks that would otherwise be performed by the CPU. The GPU executes device code, whereas the CPU executes host code. The device code is typically embedded in the host code as a single file, thus creating a heterogeneous compiler environment.

Conventional host linkers or compilers generate an executable file from multiple host objects. However, these conventional host linkers are unable to link device code embedded in multiple host objects, and therefore, require any device code to be embedded in single host object. For example, conventional host linkers can create an executable file from a first host object containing only host code (for execution by the CPU) and a second host object containing host code (for execution by the CPU) and device code (for execution by the GPU). However, conventional host linkers are unable to create an executable file from multiple host objects each containing respective host code (for execution by the CPU) and respective device code (for execution by the GPU) since the conventional host linkers are unable to properly link the respective device code embedded in each of the host objects.

SUMMARY OF THE INVENTION

Accordingly, a need exists to address the inefficiencies and disadvantages discussed above. Embodiments of the present invention provide a novel solution to generate multiple linked device code portions within a final executable file. Embodiments of the present invention are operable to extract device program code from their respective host object filesets and then link them together to form multiple linked device code portions. Also, using the identification process described by embodiments of the present invention, device code embedded within host objects may also be uniquely identified and linked in accordance with the protocols of conventional programming languages. Furthermore, these multiple linked device code portions may be then converted into distinct executable forms of code that may be encapsulated within a single executable file.

More specifically, in one embodiment, the present invention is implemented as a method of generating an executable file. The method includes uniquely identifying a device code portion associated with each host object fileset of a plurality of host object filesets used as input, in which the plurality of host object filesets comprises a plurality of host code portions and a plurality of device code portions, in which the plurality of host code portions and the plurality of device code portions execute on different processor types. In one embodiment, the device code portion is written in a version of a Compute Unified Device Architecture programming language (CUDA). In one embodiment, the plurality of host code portions comprises instructions to be executed by a central processing unit (CPU) and the plurality of device code portions comprises instructions to be exclusively executed by a graphics processing unit (GPU). In one embodiment, the plurality of host object filesets are groups of functionally-related files and the different processor types comprise a central processor type and a graphics processor type. In one embodiment, the method of uniquely identifying further includes assigning a unique identifier to the device code portion. In one embodiment, the method of assigning further includes using the unique identifier to prevent the device code portion from being used in two different linked device code portions.

The method also includes linking together the plurality of host object filesets to produce a plurality of unique linked device code portions. In one embodiment, the method of linking further includes linking the plurality of host object filesets separately. Additionally, the method includes generating the executable file, in which the executable file comprises an executable form of both the plurality of host code portions and the plurality of unique linked device code portions.

In one embodiment, the present invention is implemented as a system for building an executable file. The system includes an identification module operable to uniquely identify a device code portion associated with each host object fileset of a plurality of host object filesets used as input, in which the plurality of host object filesets comprises a plurality of host code portions and a plurality of device code portions, where the plurality of host code portions and the plurality of device code portions execute on different processor types. In one embodiment, the plurality of host code portions comprises instructions to be executed by a central processing unit (CPU) and the plurality of device code portions comprises instructions to be exclusively executed by a graphics processing unit (GPU). In one embodiment, the plurality of device code portions is written in a version of a Compute Unified Device Architecture programming language (CUDA).

In one embodiment, the plurality of host object filesets are groups of functionally-related files and the different processor types comprise a central processor type and a graphics processor type. In one embodiment, the identification module is further operable to assign a unique identifier to the device code portion. The system also includes a linking module operable to link together the plurality of host object filesets to produce a plurality of unique linked device code portions. In one embodiment, the linking module is further operable to use the unique identifier to prevent the device code portion from being used in two different linked device code portions.

In one embodiment, the linking module is further operable to link the plurality of host object filesets separately. The system also includes an executable file generation module operable to generate the executable file, in which the executable file comprises an executable form of both the plurality of host code portions and the plurality of unique linked device code portions.

In one embodiment, the present invention is implemented as a computer-implemented method of building an executable file. The method includes accessing a plurality of device code portions from a plurality of non-device code portions associated with each host object fileset of a plurality of host object filesets used as input, in which each device code portion of the plurality of device code portions is uniquely identifiable. In one embodiment, the plurality of device code portions comprises instructions to be exclusively executed by a graphics processing unit (GPU). In one embodiment, the plurality of device code portions is written in a version of a Compute Unified Device Architecture programming language (CUDA)

In one embodiment, the plurality of host object filesets are groupings of functionally related files. In one embodiment, the method of accessing further includes assigning a unique identifier to each device code portion of the plurality of device code portions. In one embodiment, the method of assigning further includes using the unique identifier to prevent each device code portion of the plurality of device code portions from being used in two different linked device code portions.

The method also includes linking together the plurality of host object filesets to produce a plurality of unique linked device code portions and a plurality of linked non-device code portions, in which the plurality of unique linked device code portions are linked separately from the plurality of linked non-device code portions using a separate linking process. In one embodiment, the method of linking further includes linking the plurality of host object filesets separately. The method also includes generating the executable file, in which the executable file comprises an executable form of the plurality of unique linked device code portions and the plurality of non-device code portions, in which the plurality of unique linked device code portions and the plurality of non-device code portions execute on different processor types.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1C provides an illustration of an exemplary memory allocation table or data structure used to map host code shadow entities to their corresponding device code entities in accordance with embodiments of the present invention.

FIG. 5 provides an illustration of an exemplary table or data structure used to track device code used in previous linking operations in accordance with embodiments of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 2, 3 and 6) describing exemplary operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Figure 1A:
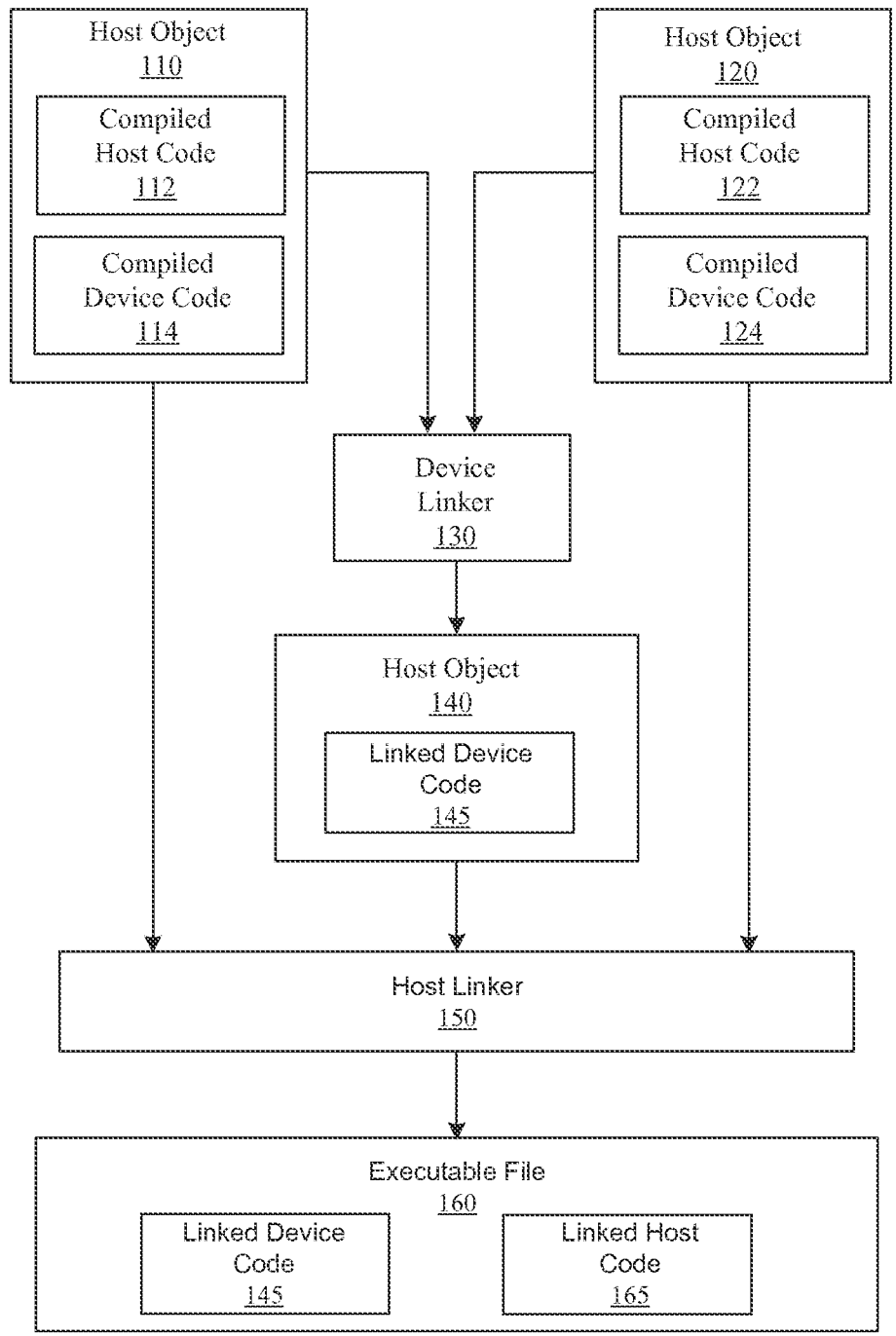
FIG. 1A is a block diagram of an exemplary linking process in accordance with embodiments of the present invention.

With reference to FIG. 1A, compiled host code (e.g., compiled host code 112) may be a set of instructions written using a human readable computer language medium (e.g., C, C++, FORTRAN) and capable of being executed by a microprocessor (e.g., CPU). Additionally, compiled device code (e.g., compiled device code 114) may be a set of instructions written using a human readable computer language medium (e.g., Compute Unified Device Architecture (CUDA)) and capable of being executed by a graphics processor unit (e.g., GPU). Both compiled host code and compiled device code may be re-locatable and capable of being embedded into a host object file. Furthermore, host object files (e.g., host object 110) may be container files that store re-locatable machine code (e.g., compiled host code 112 and compiled device code 114 of host object 110) generated using a compiler and capable of being used as input into a linker program (e.g., host linker 150 and device linker 130).

Device linker 130 may be implemented as a set of instructions which receives device code from one or more object files as input and generates another host object file to contain linked device code. Host linker 150 may be implemented as a set of instructions which receives object code from one or more object files as input and outputs a resultant executable image or shareable object file that may be used for additional linking with other host object files. According to one embodiment, host linker 150 may be capable of receiving output from device linker 130 as input when performing linking operations. According to one embodiment, device linker 130 may perform linking operations on device code prior to the execution of host linker 150. According to one embodiment of the present invention, host linker 150 may perform linking operations on object files prior to the execution of device linker 130.

As illustrated by the embodiment depicted in FIG. 1A, device linker 130 and host linker 150 can be used in combination to generate an executable file from multiple host objects each including respective device code. For example, host object 110 may include compiled host code 112 and compiled device code 114, whereas host object 120 may include compiled host code 122 and compiled device code 124. According to one embodiment, device linker 130 may perform linking operations on the same object files as host linker 150 (e.g., host object 110 and host object 120). As such, device linker 130 may link compiled device code 114 and compiled device code 124 to create linked device code 145. In one embodiment, linked device code 145 may be embedded in host object 140, where host object 140 may be a "dummy" host object or "shell."

Host linker 150 may generate executable file 160 as a result of linking host object 110 (e.g., including compiled host code 112), host object 120 (e.g., including compiled host code 122) and host object 140 (e.g., including linked device code 145). Executable file 160 may include linked device code 145 and linked host code 165. In one embodiment, linked host code 165 may be created by or responsive to a linking of host code 112 and compiled host code 122. According to one embodiment, host linker 150 may be operable to perform linking operations on self-contained device code outside of a host object file (e.g., object file containing no host code).

In one embodiment, host linker 150 may treat compiled device code (e.g., 114, 124, etc.) and/or linked device code (e.g., 145) as a data section when performing linking operations. According to one embodiment, host linker 150 may ignore compiled device code (e.g., 114, 124, etc.) and/or linked device code (e.g., 145) during linking of compiled host code (e.g., 112, 114, etc.) or host objects (e.g., 110, 120, 140, etc.). In one embodiment, compiled device code 114 and compiled device code 124 may be or include re-locatable device code. Additionally, according to one embodiment, linked device code 145 may be or include executable device code.

Embodiments of the present invention may make use of multiple device code entry points ("kernels") from the host code portion of a program into the device code portion of a program. In certain scenarios, these entry points may share the same executable device code (e.g., functions capable of being executed in parallel). As such, embodiments of the present invention may initialize host object files to call a common routine to access linked device code (e.g., linked device code 145) which may then allow each entry point to reference this linked device code. In this manner, the same set of executable device code may still be accessible to host code requiring access to it.

Furthermore, embodiments of the present invention may maintain visibility between host code and device code during separate compilation such that device entities (e.g., global functions, device and constant variables, textures, surfaces) located within the device code may still be accessible to host code. For each device entity present within the device code, analogous or "shadow" entities may be created within host code to enable the host code to gain access and gather data from a corresponding device entity. According to one embodiment, these shadow entities may be created during a pre-compilation phase.

Figure 1B:
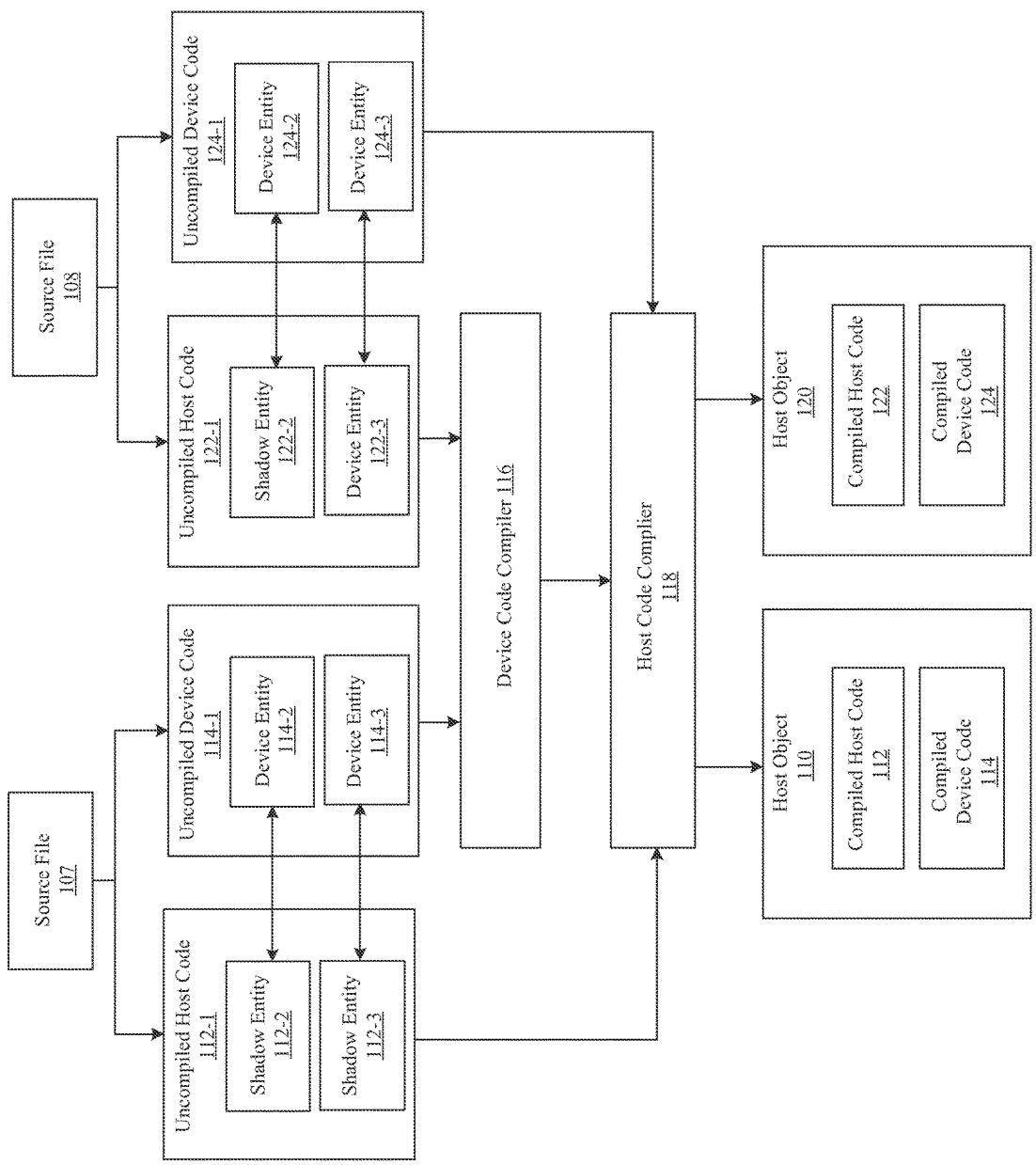
FIG. 1B is a block diagram of exemplary compilation process in accordance with embodiments of the present invention.

For instance, with reference to the embodiment depicted in FIG. 1B, source files 107 and 108 may each include uncompiled host code (e.g., 112-1 and 122-1, respectively) and uncompiled device code (e.g., 114-1 and 124-1, respectively). Uncompiled device code 114-1 may include device entities 114-2 and 114-3 which may be coded as global functions or variables that are accessible to entities outside of uncompiled device code 114-1. In response to each of these device entities, corresponding shadow entities may be created and passed to host compiler 118.

According to one embodiment, shadow entities 112-2 and 112-3 may be generated within uncompiled host code 112-1 to maintain a logical link to device entities 114-2 and 114-3 (respectively) of uncompiled device code 114-1 prior to being fed into host compiler 118. Additionally, shadow entities 112-2 and 112-3 may be given the same linkage type as the device entity that each corresponds to. For instance, if device entities 114-2 and 114-3 were designated as a "static" type, shadow entities 112-2 and 112-3 may also be given a "static" type. In a similar manner, shadow entities 122-2 and 122-3 of uncompiled host code 122-1 may be generated in correspondence with device entities 124-2 and 124-3 (respectively) of uncompiled device code 124-1 in the manner discussed above prior to being fed into host compiler 118. Furthermore, device code compiler 116 may proceed to compile uncompiled device code 114-1 and 124-1, including the aforementioned device entities.

In addition to receiving uncompiled host code 112-1 and 122-1, host code compiler 118 may additionally receive the resultant output generated by device code compiler 116 to produce host objects 110 and 120. As such, compiled host code 112 may receive shadow entities 112-2 and 112-3, whereas compiled host code 122 may receive shadow entities 122-2 and 122-3. Accordingly, upon initialization and execution, compiled host code 112 may access data from device entities 114-2 and 114-3 stored in compiled device code 114, while compiled host code 122 may access data from device entities 124-2 and 124-3 stored in compiled device code 124.

Furthermore, with reference to the embodiment depicted in FIG. 1C, table 300 may be a table stored in memory that is used to map each shadow entities created to an address in memory during code execution. According to one embodiment, upon execution of the host object file, a registration code stored within the host object file may be executed which maps the address of the shadow entity to the name of the device entity.

Also, embodiments of the present invention may also resolve name conflicts involving device entities from separate files sharing the same name during the mapping of shadow entities. For instance, according to one embodiment, two different device entities sharing the same name from different modules, each with a "static" linkage type, may be appended with a unique prefix to each instance of the "static" linkage device entity's name, thereby making the device entity uniquely identifiable in a final linked device image (e.g., linked device code 145 of FIG. 1A).

Computer System Environment

Figure 1D:
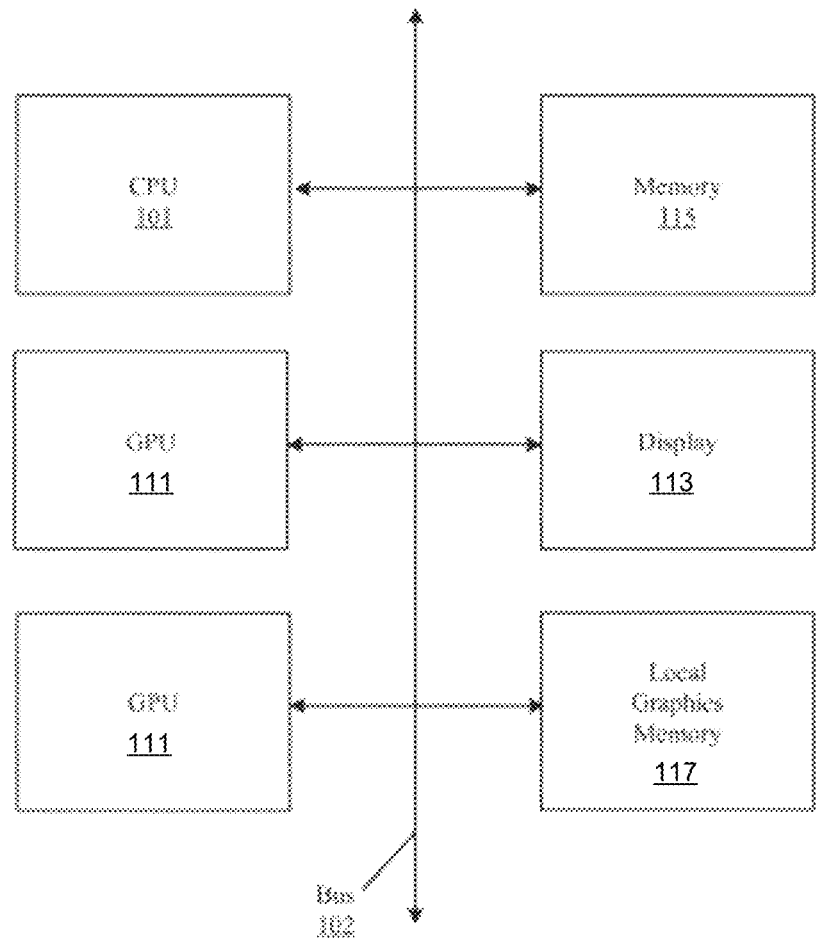
FIG. 1D is a block diagram of an exemplary computer system platform used to perform linking and compiling operations in accordance with embodiments of the present invention.

FIG. 1D shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110.

The CPU 101 can be coupled to the system memory 115 via a bridge component/memory controller (not shown) or can be directly coupled to the system memory 115 via a memory controller (not shown) internal to the CPU 101. The GPU 111 may be coupled to a display 113. One or more additional GPUs can optionally be coupled to system 100 to further increase its computational power. The GPU(s) 111 is coupled to the CPU 101 and the system memory 115. The GPU 111 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 117 can be included for the GPU 111 for high bandwidth graphics data storage.

The CPU 101 and the GPU 111 can also be integrated into a single integrated circuit die and the CPU and GPU may share various resources, such as instruction logic, buffers, functional units and so on, or separate resources may be provided for graphics and general-purpose operations. The GPU may further be integrated into a core logic component.

System 100 can be implemented as, for example, a desktop computer system or server computer system having a powerful general-purpose CPU 101 coupled to a dedicated graphics rendering GPU 111. In such an embodiment, components can be included that add peripheral buses, specialized audio/video components, IO devices, and the like. It is appreciated that the parallel architecture of GPU 110 may have significant performance advantages over CPU 101.

Figure 2:
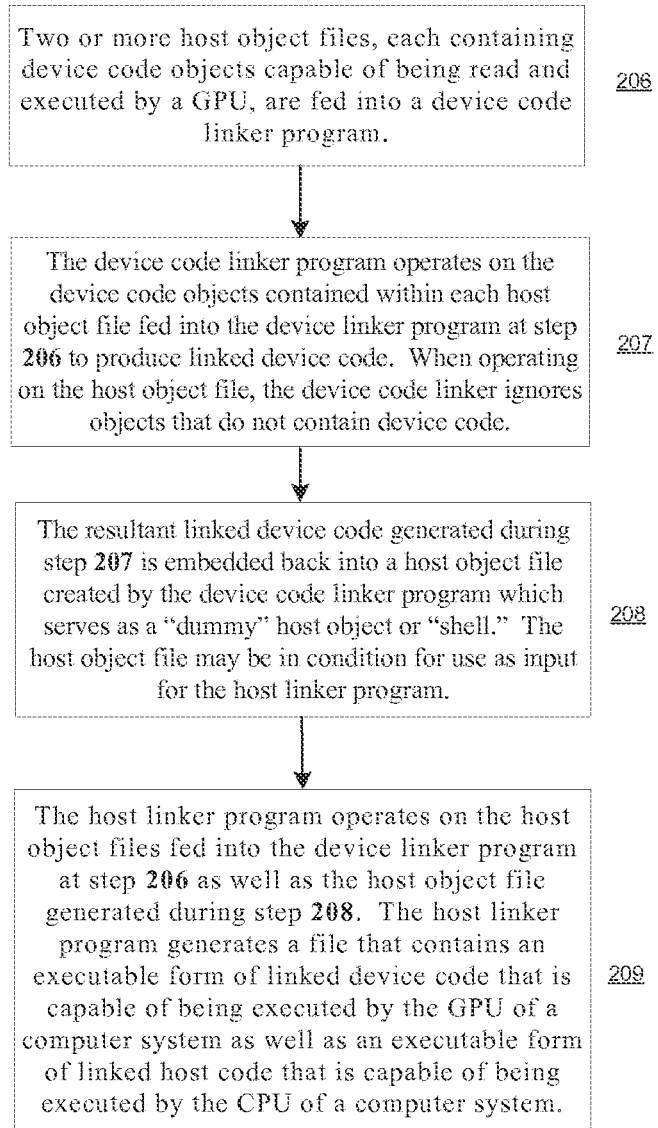
FIG. 2 depicts a flowchart of an exemplary compiling process in accordance with various embodiments of the present invention.

FIG. 2 presents flow chart that provides an exemplary computer-implemented compiling process in accordance with various embodiments of the present invention.

At step 206, two or more host object files, each containing device code objects capable of being read and executed by a GPU, are fed into a device code linker program.

At step 207, the device code linker program operates on the device code objects contained within each host object file fed into the device linker program at step 206 to produce linked device code. When operating on the host object file, the device code linker ignores objects that do not contain device code.

At step 208, the resultant linked device code generated during step 207 is embedded back into a host object file created by the device code linker program which serves as a "dummy" host object or "shell." The host object file may be in condition for use as input for the host linker program.

At step 209, the host linker program operates on the host object files fed into the device linker program at step 206 as well as the host object file generated during step 208. The host linker program generates a file that contains an executable form of linked device code that is capable of being executed by the GPU of a computer system as well as an executable form of linked host code that is capable of being executed by the CPU of a computer system.

Figure 3:
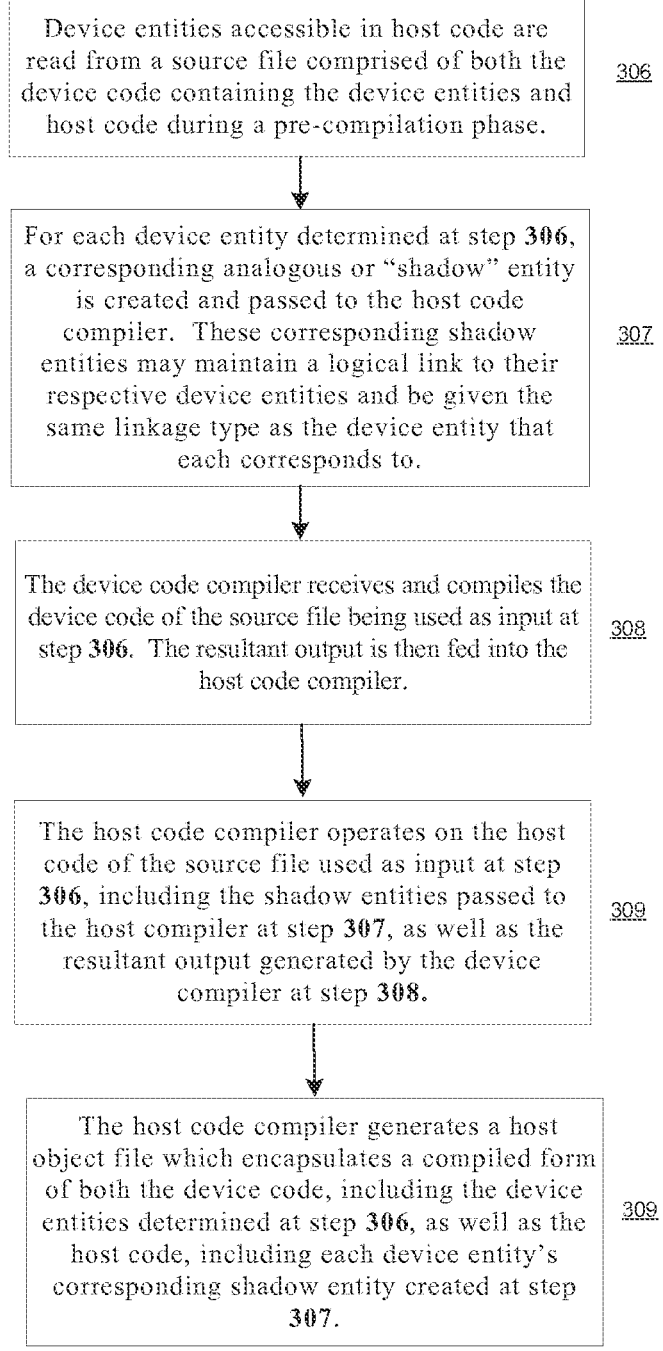
FIG. 3 depicts a flowchart of an exemplary shadow entity creation process in accordance with various embodiments of the present invention.

FIG. 3 presents flow chart that provides an exemplary computer-implemented shadow entity creation process in accordance with various embodiments of the present invention.

At step 306, device entities accessible in host code are read from a source file comprised of both the device code containing the device entities and host code during a pre-compilation phase.

At step 307, for each device entity determined at step 306, a corresponding analogous or "shadow" entity is created and passed to the host code compiler. These corresponding shadow entities may maintain a logical link to their respective device entities and be given the same linkage type as the device entity that each corresponds to.

At step 308, the device code compiler receives and compiles the device code of the source file being used as input at step 306. The resultant output is then fed into the host code compiler.

At step 309, the host code compiler operates on the host code of the source file used as input at step 306, including the shadow entities passed to the host compiler at step 307, as well as the resultant output generated by the device compiler at step 308.

At step 310, the host code compiler generates a host object file which encapsulates a compiled form of both the device code, including the device entities determined at step 306, as well as the host code, including each device entity's corresponding shadow entity created at step 307.

Exemplary Method of Embedding Multiple Device Links in a Host Executable

Embodiments of the present invention may support natural independent groupings of device code in manner that allows these groups ("filesets") to be linked separately. For instance, in a large project setting, there may one set of files containing device code for handling a first task (e.g., image handling), while another set of files may handle a second task that is independent of the first task (e.g., parallel computation). Device code from different groups may not interact directly, and, therefore, may not affect each other during compilation or linking processes. As such, embodiments of the present invention enable the first group of files to be linked together to form one executable form of linked device code, while the second group of files may be linked together separately into another executable form of linked device code. These executable forms may then be placed and packaged within the same executable file where a CPU and GPU may access their respective files and perform their respective tasks.

Figure 4:
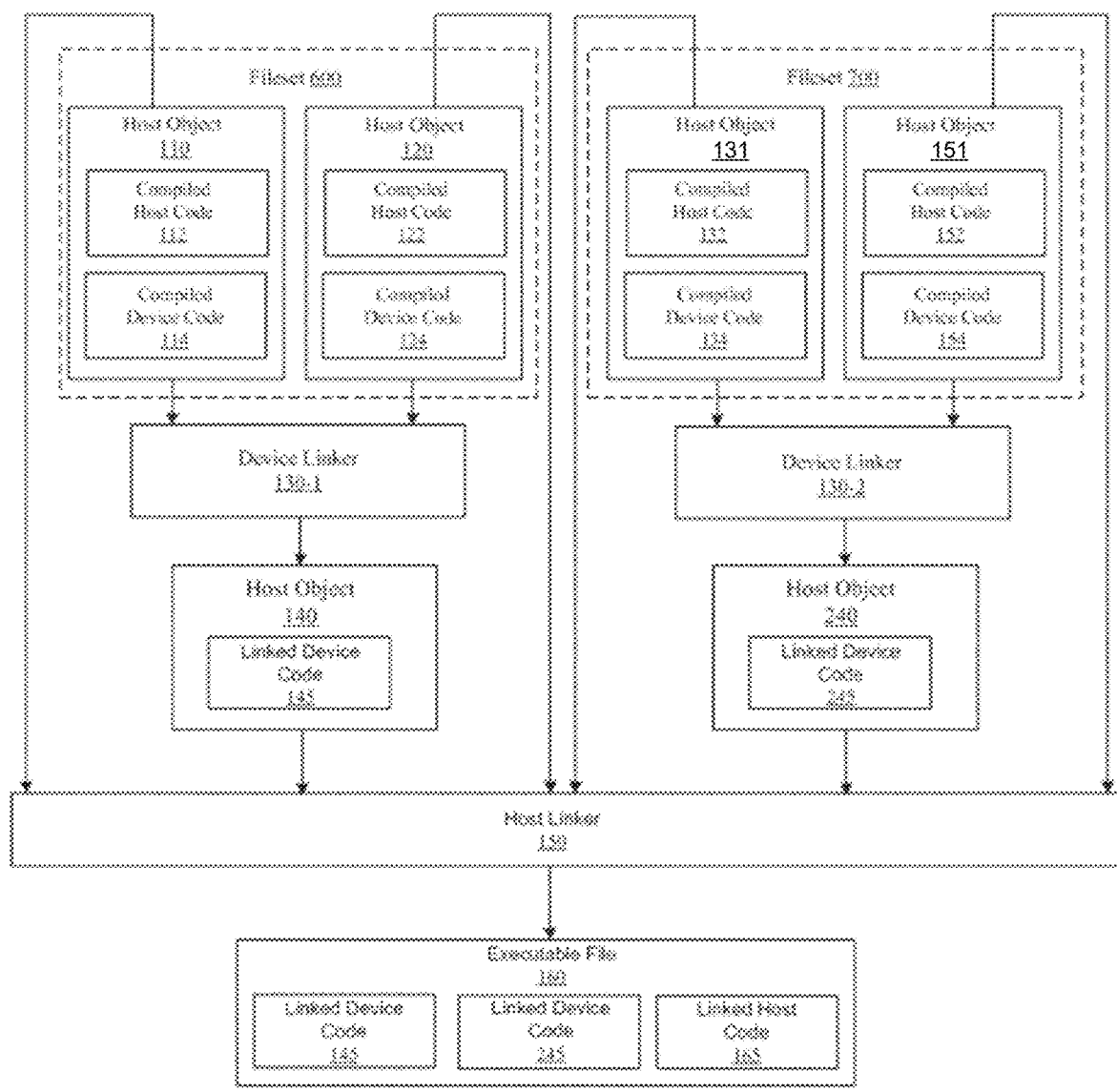
FIG. 4 is a block diagram of another exemplary compiling process in accordance with embodiments of the present invention.

As illustrated in the embodiment depicted in FIG. 4, a device linker (e.g., device linker 130-1 and 130-2) and a host linker (e.g., host linker 150) can be used in combination to generate an executable file including these multiple portions of linked device code or "device links." Multiple device links may increase analytical precision during the performance of linking operations which may yield optimal code generation. Furthermore, embedding multiple device links in the manner described by embodiments of the present invention support the linking of vendor libraries with user generated device code to generate larger object files capable of residing within the same executable file.

With reference to FIG. 4, fileset 600 may contain code that may be logically related to each other and functionally distinct from fileset 700. For example, host objects 110 and 120 of fileset 600 may contain code for use in image handling processes, whereas host objects 131 and 151 of fileset 700 may contain instructions for use in parallel computation. As such, fileset 600 and fileset 700 may not interact directly and, therefore, may not affect each other during compilation or linking.

Device linker 130-1 may link compiled device code 114 and compiled device code 124 to create linked device code 145 (e.g., as discussed above). Additionally, device linker 130-2 may link compiled device code 134 and compiled device code 154 to create linked device code 245 (e.g., similar to the generation of linked device code 145 as discussed above). According to one embodiment, device linker 130-1 and device linker 130-2 may be the same linker invoked at separate times. Each portion of linked device code (e.g., 145 and 245) may be embedded in or part of a respective host object (e.g., 140 and 240, respectively) generated by device linkers 130-1 and 130-2, respectively.

Host linker 150 may then generate executable file 160 as a result of linking host object 110 (e.g., including compiled host code 112), host object 120 (e.g., including compiled host code 122), host object 131 (e.g., including compiled host code 132), host object 151 (e.g., including compiled host code 152), host object 140 (e.g., including linked device code 145) and host object 240 (e.g., including linked device code 245). Executable file 160 may include at least one portion of linked device code (e.g., 145, 245, etc.) and linked host code (e.g., 165). In one embodiment, linked host code 165 may be created by or responsive to a linking of host codes 112, 122, 132 and 152. Accordingly, an executable file (e.g., 160) can be created that includes linked host code (e.g., 165) and multiple portions of linked device code (e.g., 145, 245, etc.).

Furthermore, embodiments of the present invention may uniquely identify each device code object linked through the use of unique identifiers. Through the use of unique identifiers, embodiments of the present invention may provide better assurance that a device code object will not be linked into two different linked device codes within the same executable file. In this manner, embodiments of the present invention may provide a safeguard which ensures that device code embedded within host objects may be uniquely identified and linked in accordance with the protocols of conventional programming languages (e.g., C++).

FIG. 5 presents an exemplary depiction of how device code objects may be uniquely identified in accordance with embodiments of the present invention. Device linker table 400 may be a table stored in memory which uniquely identifies each device code used by device linker 130 during the performance of linking operations along with the host objects that these entities are associated with ("host object ancestor"). Device linker 130 may generate a unique identifier for each device object (e.g., "module id" column) participating in the device link process.

According to one embodiment, device linker 130 may refer to device linker table 400 to determine which device objects have already participated in the linking process. Those device objects that have been identified as previous participants may be prevented from participating in the host linking operations by host linker 150. As such, attempts to build an executable file containing previous participants may be prevented from being successful. For instance, with reference to device linker table 400, given that host object 110 (containing compiled device code 114) and host object 120 (containing compiled device code 124) were linked together to produce linked device code 145, both host objects 110 and 120 may be prevented from participating in a subsequent device linking operation. If host object 110 and another host object file containing its own compiled device code (not pictured) were set forth as input to be linked by device linker 130, device linker 130 may refer to device linker table 400 and determine that host object 110 was already a participant in a previous linking operation (e.g., linked device code 145). Accordingly, device linker 130 may generate an error message to warn the user of the illegal operation.

Figure 6:
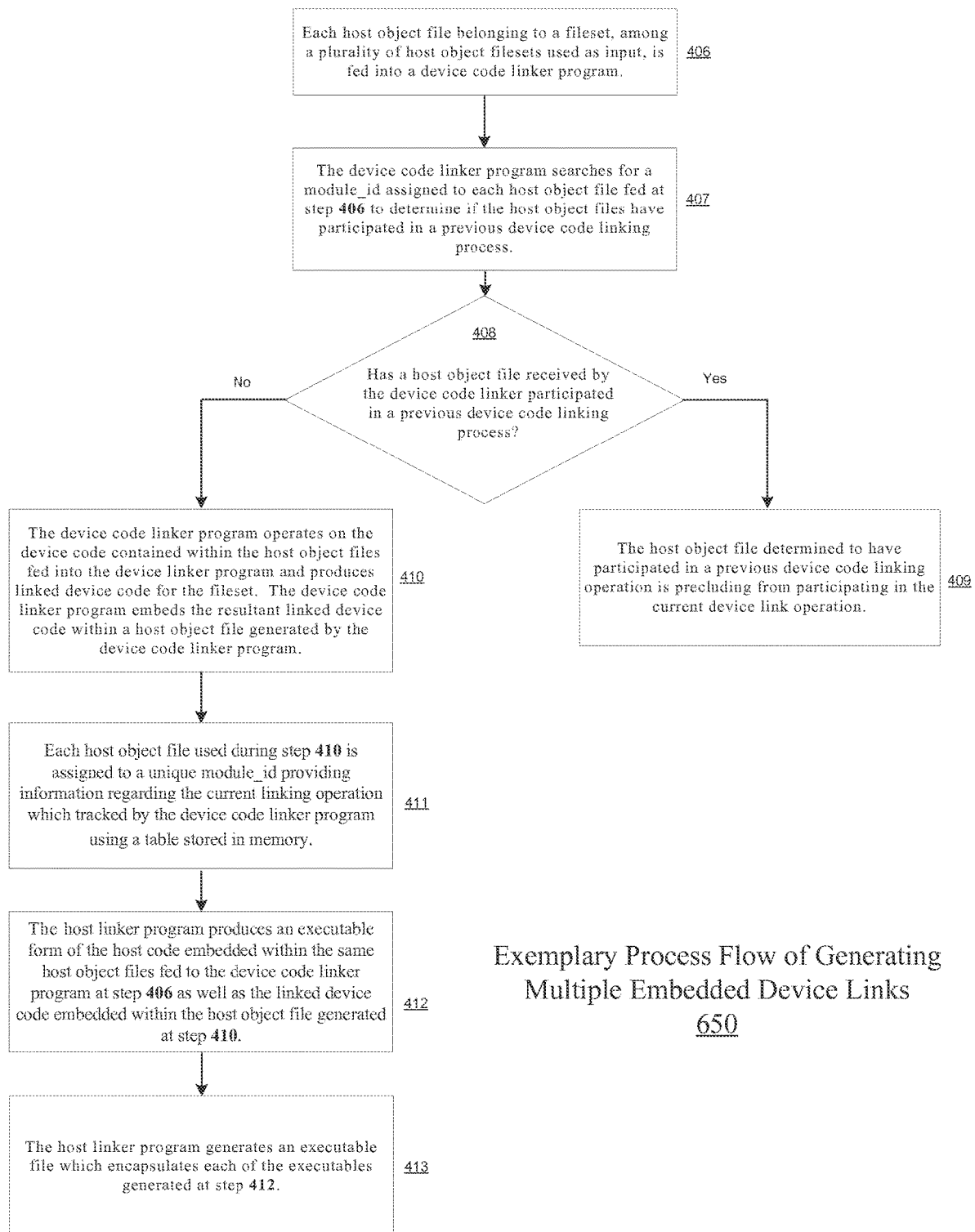
FIG. 6 depicts a flowchart of exemplary compiling process for generating multiple embedded device links in accordance with various embodiments of the present invention.

FIG. 6 presents flow chart that provides an exemplary computer-implemented device code compiling process in accordance with various embodiments of the present invention.

At step 406, each host object file belonging to a fileset, among a plurality of host object filesets used as input, is fed into a device code linker program.

At step 407, the device code linker program searches for a unique identification code (e.g., module id) assigned to each host object file fed at step 406 to determine if the host object files have participated in a previous device code linking process.

At step 408, a determination is made as to whether the host object files received by the device code linker have participated in a previous device code linking process. If the host object files have not participated in a previous device code linking operation, then the device code linker program operates on the device code embedded within the host object files fed into the device linker program at step 406, as detailed in step 410. If the one of the host object files has participated in a previous device code linking operation, then that host object file is precluding from participating in the current device link operation, as detailed in step 409.

At step 409, a host object file fed at step 406 has been determined to have participated in a previous device code linking operation and, therefore, is precluding from participating in the current device link operation.

At step 410, the host object files have been determined to have not participated in a previous device code linking operation and, therefore, the device code linker program operates on the device code contained within the host object files fed into the device code linker program and produces linked device code. The device code linker program embeds the resultant linked device code within a host object file generated by the device code linker program.

At step 411, each host object file used during step 410 is assigned to a unique identification code (e.g., module id) providing information regarding the current linking operation which is tracked by the device code linker program using a table stored in memory.

At step 412, the host linker program produces an executable form of the host code embedded within the same host object files fed to the device code linker program at step 406 as well as the linked device code embedded within the host object file generated at step 410.

At step 413, the host linker program generates an executable file which encapsulates each of the executables generated at step 412.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer-implemented method, comprising:
   causing a linker to link at least two portions of device object code and at least one portion of host object code;
   generating an executable file comprising an executable form of the at least two portions of device object code and at least one portion of host object code; and
   accessing the executable file for execution using different processor types, wherein the different processor types comprise a central processing unit (CPU) and a graphics processing unit (GPU).

2. The computer-implemented method of claim 1, further comprising assigning a unique identifier to the at least two portions of device object code.

3. The computer-implemented method of claim 2, wherein the assigning further comprises using the unique identifier to prevent the at least two portions of device object code from being linked more than once.

4. The computer-implemented method of claim 1, wherein the at least one of portion of host object code comprises instructions to be executed by the CPU and the at least two portions of device object code comprise instructions to be executed by the GPU.

5. The computer-implemented method of claim 1, wherein the at least two portions of device object code are written in a version of a Compute Unified Device Architecture programming language (CUDA).

6. The computer-implemented method of claim 1, wherein the at least two portions of device object code are provided to a device linker from a host object.

7. A system for executing code, the system comprising:
   one or more processors to cause a linker to link at least two portions of device object code and at least one portion of host object code;
   an executable file generation module to generate an executable file comprising an executable form of the at least two portions of device object code and at least one portion of host object code; and
   at least two different processor types to execute the executable file, wherein the at least two different processor types comprise a central processing unit (CPU) and a graphics processing unit (GPU).

8. The system of claim 7, further comprising an identification module to assign a unique identifier to the at least two portions of device object code, and wherein the one or more processors are further operable to use the unique identifier to prevent the at least two portions of device object code from being linked more than once.

9. The system of claim 8, wherein the at least two portions of device object code are obtained from different object filesets.

10. The system of claim 7, wherein the at least one portion of host object code comprises instructions to be executed by the CPU and the at least two portions of device object code comprise instructions to be executed by the GPU.

11. The system of claim 7, wherein the at least two portions of device object code are written in a version of a Compute Unified Device Architecture programming language (CUDA).

12. The system of claim 7, wherein the at least two portions of device object code are provided to a device linker for the linking from a host object.

13. A non-transitory computer-readable storage medium including instructions to execute code, the instructions when executed by at least one processor of a computing device causing the computing device to:

cause a linker to link at least two portions of device object code and at least one portion of host object code;

generate an executable file comprising an executable form of the at least one portion of host object code and the at least two portions of device object code; and access the executable file for execution using different processor types, wherein the different processor types comprise a central processing unit (CPU) and a graphics processing unit (GPU).

14. The non-transitory computer-readable storage medium of claim 13, wherein accessing further comprises assigning a unique identifier to the at least two portions of device object code.

15. The non-transitory computer-readable storage medium of claim 14, wherein the assigning further comprises using the unique identifier to prevent the at least two portions of device object code from being linked more than once.

16. The non-transitory computer-readable storage medium of claim 13, wherein the at least two portions of device object code comprise instructions to be executed by the GPU.

17. The non-transitory computer-readable storage medium of claim 13, wherein the at least two portions of device object code are written in a version of a Compute Unified Device Architecture programming language (CUDA).

18. One or more processors, comprising: circuitry to cause a linker to link at least two portions of device object code and at least one portion of host object code and to generate an executable file comprising the at least two portions of device object code and the at least one portion of host object code to be executed by at least a central processing unit (CPU) and a graphics processing unit (GPU).

19. The one or more processors of claim 18, wherein the circuitry is further to assign a unique identifier to the at least two portions of device object code.

20. The one or more processors of claim 19, wherein the assigning further comprises using the unique identifier to prevent the at least two portions of device object code from being linked more than once.

21. The one or more processors of claim 18, wherein the at least one portion of host object code comprises instructions to be executed by the CPU and the at least two portions of device object code comprise instructions to be executed by the GPU.

22. The one or more processors of claim 18, wherein the at least two portions of device object code are written in a version of a Compute Unified Device Architecture (CUDA) programming language.

23. The one or more processors of claim 18, wherein the at least two portions of device object code are provided to a device linker from a host object.

* * * * *